United States Patent [19]

Runas

[11] Patent Number: 5,663,984
[45] Date of Patent: Sep. 2, 1997

[54] HIGH PERFORMANCE BUS DRIVING/RECEIVING CIRCUITS, SYSTEMS AND METHODS

[75] Inventor: Michael E. Runas, McKinney, Tex.

[73] Assignee: Cirrus Logic, Inc., Fremont, Calif.

[21] Appl. No.: 434,656

[22] Filed: May 4, 1995

[51] Int. Cl.$^6$ ............................................. H04L 27/00
[52] U.S. Cl. ............................. 375/257; 327/74; 370/284
[58] Field of Search .................................. 375/257, 259, 375/285; 327/63, 64, 65, 67, 68, 69, 74, 560, 561, 563; 370/284, 283

[56] References Cited

U.S. PATENT DOCUMENTS

| | | | |
|---|---|---|---|
| 3,906,254 | 9/1975 | Lane et al. | 307/205 |
| 4,039,862 | 8/1977 | Dingwoll et al. | 307/247 |
| 4,450,371 | 5/1984 | Bismarck | 307/475 |
| 4,486,670 | 12/1984 | Chan et al. | 307/264 |
| 4,730,131 | 3/1988 | Sauer | 307/443 |
| 4,899,068 | 2/1990 | Klose et al. | 327/561 |
| 4,914,318 | 4/1990 | Allen | 307/272.2 |
| 4,943,740 | 7/1990 | Gulczynski | 307/454 |
| 4,978,870 | 12/1990 | Chen et al. | 307/475 |
| 4,991,136 | 2/1991 | Mihara | 365/49 |
| 5,047,980 | 9/1991 | Shookhtim et al. | 365/177 |
| 5,113,090 | 5/1992 | Imaizumi et al. | 327/63 |
| 5,251,178 | 10/1993 | Childers | 365/227 |
| 5,285,115 | 2/1994 | Tsusi | 307/362 |
| 5,329,171 | 7/1994 | Shimizy et al. | 307/354 |
| 5,369,319 | 11/1994 | Good et al. | 327/73 |
| 5,399,913 | 3/1995 | Widener et al. | 327/108 |

*Primary Examiner*—Tesfaldet Bocure
*Assistant Examiner*—Bryan Webster
*Attorney, Agent, or Firm*—Winstead Sechrest & Minick, P.C.

[57] ABSTRACT

Circuitry 200 is provided for transmitting data between a first endpoint and a second endpoint and includes an information line 201 and a dummy line 205. Information transmission circuitry 202, 203, 204 is disposed at the first endpoint for transmitting information on information line 201, transmission circuitry 202, 203, 204 pulling information line 201 to a low voltage during transmission of information of a first logic state and charging information line 201 to a higher voltage during transmission of information of a second logic state. Charging circuitry 206, 207, 208 is disposed at the first endpoint for charging dummy line 205 to a reference voltage during transmission of information on information line 201, charging circuitry 206, 207, 208 charging dummy line 205 at a rate different from a rate at which transmission circuitry 202, 203, 204 charges information line 201 during transmission of information of the second logic state. Receiving circuitry 209 is disposed at the second endpoint for detecting a voltage difference between information line 201 and dummy line 205 and in response determining the logic state of transmitted data on information line 201.

21 Claims, 2 Drawing Sheets

HIGH PERFORMANCE BUS DRIVING/RECEIVING CIRCUITS, SYSTEMS AND METHODS

CROSS-REFERENCE TO RELATED APPLICATIONS

The following copending and coassigned United States patent applications contain related material and are incorporated by reference:

U.S. patent application Ser. No. 08/420,138, Attorney Docket No. 2836-P017US, entitled "Bus Driver/Receiver Circuitry and Systems and Methods Using The Same."

TECHNICAL FIELD OF THE INVENTION

The present invention relates in general to electronic circuitry and in particular to high performance data transmission circuits, systems, and methods.

BACKGROUND OF THE INVENTION

In designing high performance integrated circuits, the high speed transfer of addresses and data between circuit blocks is a critical consideration. This is especially true in applications where a memory and a high performance state machine are being integrated into a single chip. One such instance is when a display controller and a frame buffer are being integrated to produce single-chip high performance display control device. In this case, substantial amounts of data, and the corresponding addresses, must be transferred between the graphics controller and the frame buffer at rates high enough to support display refresh and update, and other processing operations such as filtering. As display systems with increased resolution and bit depths are developed, the rate at which data must be transferred between the controller and the frame buffer consequently increases. While some of the necessary bandwidth can be achieved by using wide buses, improvement in the speed at which data is transferred over the individual bus lines is still required.

The lines of a typical on-chip bus are long, thin conductors which extend relatively substantial lengths across the face of the substrate, the substrate spacing each conductor from the chip ground plane. As a result of this configuration, each line presents a significant capacitance which must be charged or discharged by a driver or similar circuit during data transmission. The result is substantial power consumption, in particular when the driver is driving one or more bus lines towards the positive voltage supply rail to transmit logic high data. This power consumption is primarily due to bus line capacitance, which increases directly with the data transmission rate across the bus conductors. In general, $P=CV^2f$, where P is the power loss through each conductor, V is the voltage applied, C is the capacitance of the conductor and f is the frequency at which the conductor is charged/discharged. It should also be noted that some additional power consumption results from the resistance of each bus line.

It is possible to reduce power consumption by reducing the capacitance of the bus lines themselves. This option however requires that the fabrication process for the chip be modified. Such a change in process to reduce line capacitance would be expensive and may adversely effect the fabrication of other circuitry on the chip. Another option is to reduce the frequency at which data is transferred across the bus. Assuming that the width of the bus is not increased, this option simply trades off system performance for power reduction, an option which usually is not viable in the design implementation of high performance devices.

Thus, the need has arisen for improved circuits, systems and methods for the high speed transfer of data and/or addresses across the lines of a bus. Such circuits, systems and methods should advantageously minimize power consumption and the problems attendant therewith. In particular, such circuits, systems and methods should be applicable to high performance integrated circuit applications, such as when a display controller and frame buffer are integrated on a single chip. Finally, such circuits, systems and methods should neither require expensive and complicated changes to the chip fabrication process nor require a reduction in system performance for implementation.

SUMMARY OF THE INVENTION

The principles of the present invention provide circuits, systems and methods for transmitting data between circuit blocks. In general, a dummy line is provided in parallel with each data/address transmission line coupling the circuit blocks. During transmission of logic high data (or addresses), the dummy line is charged at a rate lower than a rate at which the transmission line is charged. During the transmission of logic low data (addresses) the dummy line is charged while data transmission line remains at a low voltage. In each case, information is received by sensing the voltage difference between the transmission line and the corresponding dummy line following a predetermined time delay.

According to one embodiment, circuitry is provided for transmitting information between a first endpoint and a second endpoint which includes an information transmission line and a dummy line. Information transmission circuitry disposed at the first endpoint is provided for transmitting information on the information line, the transmission circuitry pulling the information line to a low voltage during transmission of information of a first logic state and charging the information line to a higher voltage during transmission of information of a second logic state. Charging circuitry is disposed at the first endpoint for charging the dummy line to a reference voltage during transmission of information on the information line. The charging circuitry charges the dummy line at a rate different from the rate at which the transmission circuitry charges the information line during a transmission of information of the second logic state. Receiving circuitry is disposed at the second endpoint for detecting a voltage difference between the information line and the dummy line and in response determining the logic state of the transmitted information on the information line.

According to a second embodiment, data transmission circuitry is provided which includes a transmission line and a dummy line. A first transistor is included having a first source/drain coupled to a voltage supply and a gate coupled to receive information to be transmitted on the transmission line. A second transistor is included having a first source/drain coupled to a second source/drain of the first transistor, a second source/drain coupled to the transmission line, and a gate coupled to a bias voltage. A third transistor has a first source/drain coupled to the voltage supply and a gate coupled to receive a clock signal. A fourth transistor is included having a first source/drain coupled to the second source/drain of the third transistor, a second source/drain coupled to the dummy line, and a gate coupled to the bias voltage. The fourth transistor differs in size from the second transistor. Receiver circuitry is provided for detecting a voltage difference between the transmission line and the dummy line to determine a logic state of transmitted information on the transmission line.

The principles of the present invention are also embodied in a system including a memory coupled to associated processing circuitry by information transmission circuitry. The transmission circuitry includes an information line, a dummy line, driver circuitry, charging circuitry, and receiving circuitry. The driver circuitry pulls the information line to a low voltage during transmission of information of a first logic state and charges the information line to a higher voltage during transmission of information of a second logic state. During the transmission of information of either logic state, the charging circuitry charges the dummy line to a reference voltage at a rate lower than a rate at which the driver circuitry charges the information line during transmission of information of the second logic state. The receiving circuitry detects a voltage difference between the information line and the dummy line, the first logic state detected when the voltage on the information line is less than the reference voltage on the dummy line and the second logic state detected when the voltage on the information line is greater than the voltage on the dummy line.

The principles of the present invention are further embodied in methods for transmitting data between first and second endpoint circuits. According to one such method, a transmission line coupling the first and second endpoint circuits is pulled to a low voltage during the transmission of information of a first logic state and charged to a higher voltage during the transmission of information of a second logic state. A dummy line is charged at a rate different than a rate at which the transmission line is charged during the transmission of information of the second logic state. A voltage difference is sensed at the second endpoint circuit between the transmission line and the dummy line, data of the first logic state detected when the voltage on the transmission line is less than the reference voltage on the dummy line and data of the second logic state detected when the voltage on the transmission line is greater than the reference voltage on the dummy line.

Circuits, systems and methods embodying the principles of the present invention have substantial advantages over the prior art. In particular, these principles can be applied to the high speed transfer of data and/or addresses across the lines of a bus without undue consumption of power. In particular, the principles of the present invention can be advantageously applied to single chip integrated circuit devices including both a high performance state machine and a memory. Additionally, the principles of the present invention do not require the generation of additional voltages for their implementation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts. For purposes of illustration, the principles of the present invention will be described as may be implemented in a display system frame buffer although these principles may be applied to a number of different data processing circuits and systems as will become apparent from the discussion below.

Figure 1:
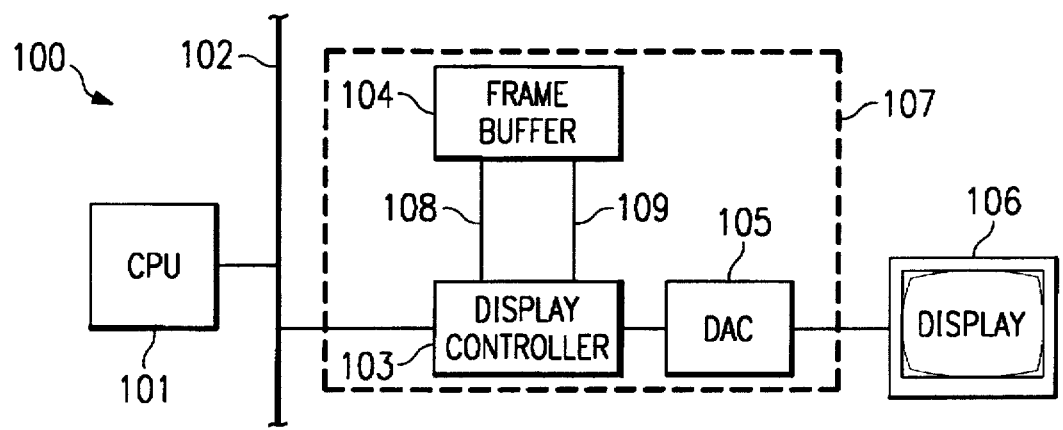
FIG. 1 is a functional block diagram of a display control system.

FIG. 1 is a high level functional block diagram of the portion of a processing system 100 controlling the display of graphics and/or video data. System 100 includes a central processing unit 101, a system bus 102, a display controller 103, a frame buffer 104, a digital to analog converter (DAC) 105 and a display device 106. Display controller 103, frame buffer 104 and DAC 105 may fabricated together on a single integrated circuit chip 107 or on separate chips. Display controller 103 and frame buffer 104 are coupled by an address bus 108 and an associated data bus constructed in accordance with the principles of the present invention.

CPU 101 controls the overall operation of system ("master") 100, determines the content of graphics data to be displayed on display unit 106 under user commands, and performs various data processing functions. CPU 101 may be for example a general purpose microprocessor used in commercial personal computers. CPU 101 communicates with the remainder of system 100 via system bus 102, which may be for example a local bus, an ISA bus or a PCI bus. DAC 105 receives digital data from controller 103 and outputs in response the analog data required to drive display 106. Depending on the specific implementation of system 100, DAC 105 may also include a color palette, YUV to RGB format conversion circuitry, and/or x- and y-zooming circuitry, to name a few options.

Display 106 may be for example a CRT unit or liquid crystal display, electroluminescent display (ELD), plasma display (PLD), or other type of display device displays images on a display screen as a plurality of pixels. It should also be noted that in alternate embodiments, "display" 106 may be another type of output device such as a laser printer or similar document view/print appliances.

Figure 2:
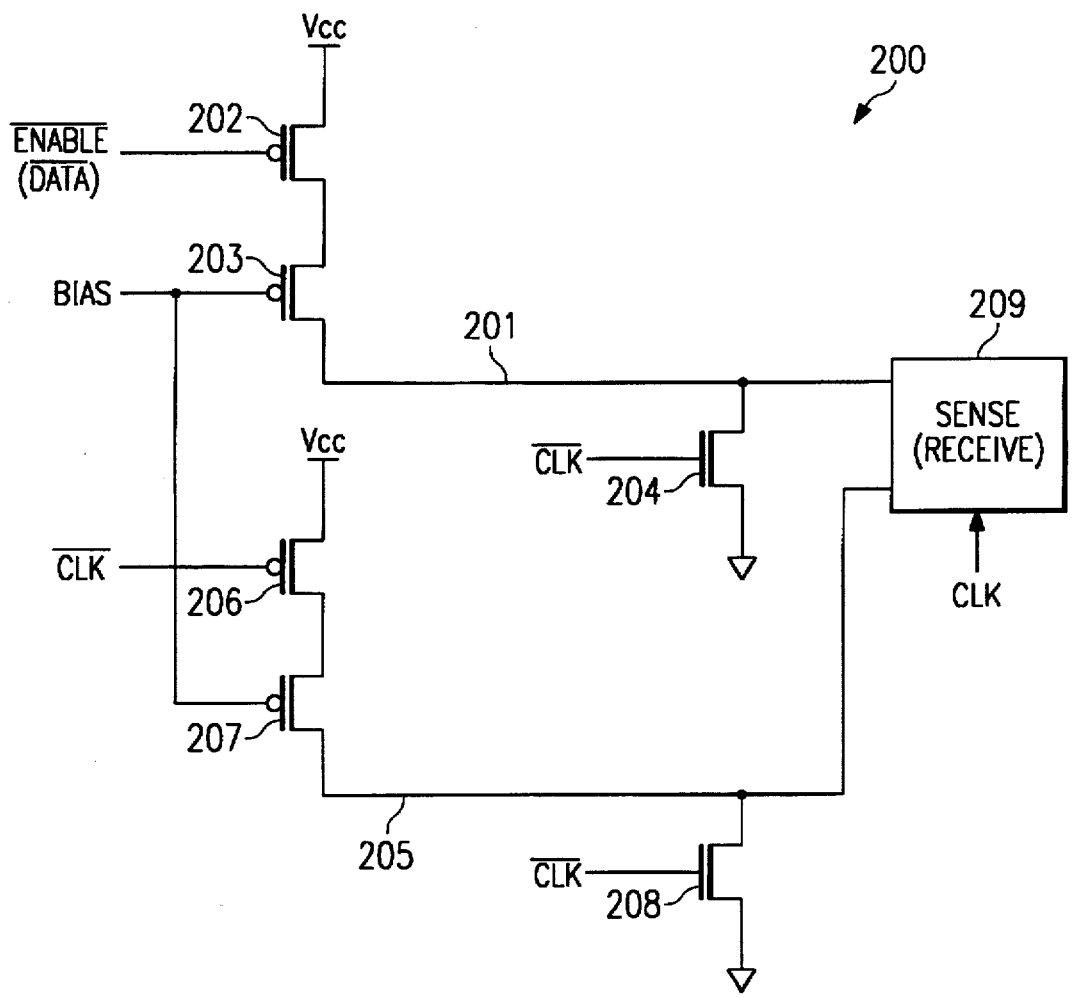
FIG. 2 is an electrical schematic diagram of bus driver/receiver circuitry according to the principles of the present invention.

FIG. 2 is an electrical schematic diagram of bus driver/receiver circuitry 200 for transmitting data or address ("information") across a transmission (information) line, such as a given line 201 of address bus 108 or data bus 109. In FIG. 2, the selected line 201 is assumed to be unidirectional for discussion purposes. In applications, such as data bus 109 where each bus line is bidirectional, a pair of bus driver/receiver circuits 200 are provided, one for transferring data in each direction. It should be noted that in system 100, driver/receiver circuitry 200 could also be applied to the transmission of data and/or addresses between system bus 102 and display controller 103, between display controller 103 and DAC 105, or between DAC 105 and display 106, to name only a few examples.

The voltage (data) on selected bus line 201 is controlled by a pair of series coupled p-channel transistors 202 and 203 and an n-channel transistor 204. The gate of transistor 202 receives a control signals $\overline{\text{ENABLE}}$ and the gate of transistor 203 is set to a preselected bias voltage BIAS. The gate of transistor 204 is controlled by a clock signals $\overline{\text{CLK}}$.

According to the principles of the present invention, each bus line 201 operates in parallel with a corresponding dummy line 205. Preferably, dummy line 205 has a capacitance approximating the capacitance of transmission line 201. The voltage (data) on each dummy line 205 is controlled by a pair of series coupled p-channel transistors 206 and 207 and a n-channel transistor 208. The gate of transistor 206 is coupled to clock signal $\overline{\text{CLK}}$ and the gate of transistor 207 is coupled to bias voltage BIAS. N-channel transistor 208 also has a gate coupled clock signal $\overline{\text{CLK}}$. In the preferred embodiment, transistor 207 driving dummy line 205 is approximately one-half the size of transistor 203 driving data line 201.

Figure 4:
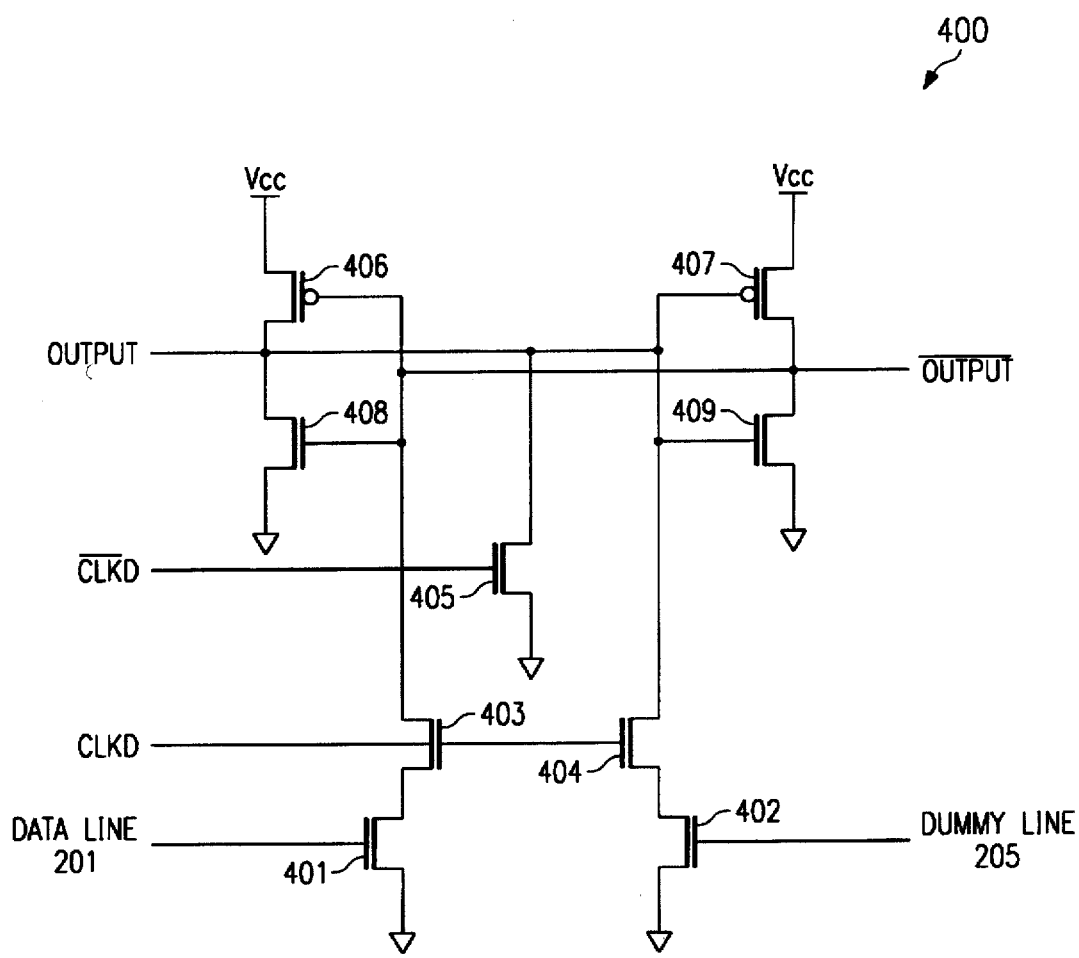
FIG. 4 is an electrical schematic diagram of a sense (receive) circuit suitable for use in the circuitry of FIG. 2.

Data is received by sense (receiver) circuitry 209. Sense circuitry 209 detects the voltage difference between data line 201 and its corresponding dummy line 205 to determine if logic zero or logic one data is being transmitted. Preferably, the sensing takes place following a delay after the clock $\overline{\text{CLK}}$ goes active (low). A preferred circuit for implementing sense circuitry 209 is shown in FIG. 4 and discussed in further detail below.

The operation of driver/receiver circuitry 200 can now be described in detail. Two transmission modes are available, one for transferring logic high data and the other for transferring logic low data. In each case, both bus line 201 and its corresponding dummy line 205 are precharged to ground prior to the transmission. Precharge occurs when clock $\overline{\text{CLK}}$ transitions high and n-channel transistors 204 and 208 turn on.

When logic high (logic 1) data is being transmitted on line 201, $\overline{\text{ENABLE}}$ transitions to a logic low following the falling edge of $\overline{\text{CLK}}$. P-channel transistor 202 turns on, n-channel transistor 204 turns off, and line 201 begins to charge through transistor 203. At the same time, p-channel transistor 206 turns on, n-channel transistor 208 turns off, and corresponding dummy line 205 begins to charge through transistor 207. The relationship between the voltage on bus line 201 and dummy line 205 is shown for this case in FIG. 3A. Since transistor 203 is approximately twice the size of transistor 207, and both are biased with the same bias voltage BIAS, bus line 201 is charged at approximately twice the rate of dummy line 205. After a time delay t, to allow a sufficient voltage difference $\Delta V$ to be established, sensing circuitry 209 senses the difference in voltage between bus line 201 and dummy line 205 as a logic 1.

Figure 3A:
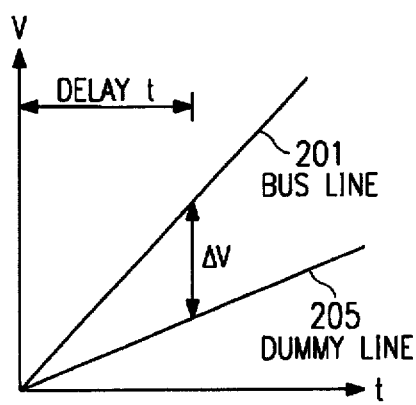
FIGS. 3a and 3b are voltage versus time graphs of the voltages on the information and dummy lines shown in FIG. 2 during the transmission of logic high and logic low information respectively.
Figure 3B:
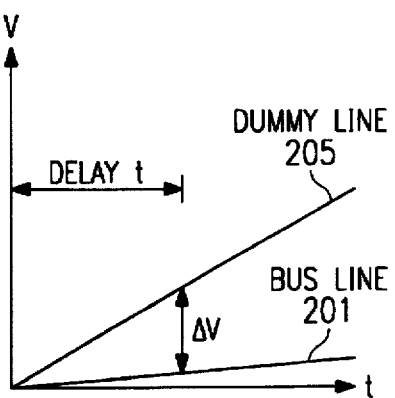

When logic low (logic 0) data is being transmitted, $\overline{\text{ENABLE}}$ is kept high such that bus line 201 will not charge when $\overline{\text{CLK}}$ goes active. When clock CLK (BAR) goes low dummy line 205 is charged through transistors 206 and 208. The resulting relationship between the voltage on bus line 201 and dummy line 205 is depicted in FIG. 3B. After a time delay t, the voltage difference $\Delta V$ between line 201 and dummy line 205 sensed by sense circuitry 209 and, in this case, a logic 0 is detected.

It should further be noted, one of the advantages of the present invention is that, other than the generation of bias voltage BIAS, no additional voltages are required on either the transmitting or receiving end.

FIG. 4 depicts a preferred circuit 400 for implementing sense circuitry 209. Data line 201 and dummy line 205 are coupled to the gates of n-channel transistors 401 and 402 respectively. Clock signal CLKD is coupled to the gates of n-channel transistors 403 and 404. The complement of clock CLKD, $\overline{\text{CLKD}}$ is coupled to the gate of n-channel transistor 405. In the preferred embodiment, clock signals CLKD and $\overline{\text{CLKD}}$ are generated from clock CLK (FIG. 2) by delaying the transitions to the active period by time delay t (see FIGS. 3A and 3B).

N-channel transistors 401–405 control a cross-coupled latching circuit formed by p-channel transistors 406 and 407 and n-channel transistors 408 and 409. P-channel transistors 406 and 407 selectively couple receiver circuitry 400 to a voltage rail at the system (chip) supply voltage $V_{cc}$. The embodiment of circuitry 400 shown in FIG. 4 includes true and complementary outputs OUTPUT and OUTPUT BAR.

When sensing of data (logic high or logic low) is ready to take place, clock CLK goes high and its complement $\overline{\text{CLK}}$ goes low. Consequently, transistors 403 and 404 are turned on and transistor 405 is turned off. In this state, the latching circuitry of transistors 406–409 is controlled by the voltages received at the gates of transistors 401 and 402.

When logic 1 data is received, the voltage at the gate of transistor 401 is greater than that presented at the gate of transistor 402. Transistor 401 therefore pulls down the voltage at the gates of transistors 406 and 408 and node $\overline{\text{OUTPUT}}$ more than transistor 402 pulls down the voltage at the gates of transistors 407 and 409 and node OUTPUT. In this state, p-channel transistor 406 and n-channel transistor 409 are on and p-channel transistor 407 and n-channel transistor 408 are off. The result is that the true output node OUTPUT is latched high and the complementary output node, $\overline{\text{OUTPUT}}$ is latched low.

When logic low data is received, the voltage at the gate of transistor 401 is less than the voltage appearing at the gate of transistor 402. Transistor 402 therefore pulls down the gates of transistors 407 and 409 and node OUTPUT more than transistor 401 pulls down the gates of transistors 406 and 408 and node $\overline{\text{OUTPUT}}$. P-channel transistor 407 and n-channel transistor 408 are turned on while p-channel transistor 406 and n-channel transistor 409 are turned off. Thus, true output node OUTPUT is latched low and complementary node $\overline{\text{OUTPUT}}$ is latched high.

The principles of the present invention advantageously allow for the low power transmission of data between endpoint circuits at high speed. Further, the circuits, systems and methods described above can operate from the standard power supply voltages (VCC) typically used in integrated circuits. In other words, no special voltages need be generated. Further, the principles of the present invention can be embodied using conventional integrated circuit fabrication techniques.

Although the present invention and its advantages have been described in detail, it should be understood that various changes, substitutions and alterations can be made herein without departing from the spirit and scope of the invention as defined by the appended claims.

What is claimed is:

1. Circuitry for transmitting information between a first endpoint and a second endpoint comprising:

a information line;

a dummy line;

information transmission circuitry disposed at said first endpoint for transmitting information on said information line, said transmission circuitry pulling said information line to a low voltage during transmission of information of a first logic state and charging said information line to a higher voltage during transmission of information of a second logic state;

charging circuitry disposed at said first endpoint for charging said dummy line to a reference voltage during transmission of information on said information line, said charging circuitry charging said dummy line at a rate different from a rate a which said transmission circuitry charges said information line during transmission of information of said second logic state; and receiving circuitry disposed at said second endpoint for detecting a voltage difference between said information line and said dummy line and in response determining said logic states of transmitted information on said information line, said receiving circuitry detecting information of said first logic state when said voltage on said information line is less than said reference voltage on said dummy line and detecting information of said second logic state when said voltage on said information line is greater than said voltage on said dummy line.

2. The circuitry of claim 1 wherein said transmission circuitry charges said information line during transmission of information of said second logic state at a rate approximately twice said rate said charging circuitry charges said dummy line.

3. The circuitry of claim 1 wherein:

said information transmission circuitry comprises:

first and second transistors having respective current paths coupled in series between a voltage supply rail and said information line, said first transistor of said transmission circuitry having a gate for receiving information to be transmitted and said second transistor of said transmission circuitry having a gate coupled to a bias voltage supply; and said charging circuitry comprises:

first and second transistors having respective current paths coupled in series between said voltage supply rail and said dummy line, said first transistor of said charging circuitry having a gate coupled to a signal enabling charging of said dummy line from said voltage rail of information and said second transistor of said charging circuitry having a gate coupled to said bias voltage.

4. The circuitry of claim 3 wherein said second transistor of said transmission circuitry is approximately twice as large as said second transistor of said charging circuitry.

5. The circuitry of claim 1 wherein said receiving circuitry comprises latching circuitry operable to latch to a state corresponding to said voltage difference between said information line and said dummy line.

6. The circuitry of claim 1 wherein said receiving circuitry comprises:

latching circuitry including:

a first transistor of a first type having a first source/drain coupled to a supply voltage rail;

a second transistor of a second type having a first source/drain coupled to a second source/drain of said first transistor and a second source/drain coupled to ground;

a third transistor of said first type having a first source/drain coupled to said supply voltage rail; and a fourth transistor of said second type having a first source/drain coupled to a second source/drain of said third transistor and a second source/drain coupled to ground; and a first control transistor having a gate coupled to said information line, a first source/drain coupled to respective gates of said first and second transistors of said latching circuitry and said second source/drain of said third transistor of said latching circuitry, and a second source/drain coupled to ground; and a second control transistor having a gate coupled to said dummy line, a first source/drain coupled to respective gates of said third and fourth transistors of said latching circuitry and said second source/drain of said first transistor of said latching circuitry, and a second source/drain coupled to ground.

7. Information transmission circuitry comprising:

a transmission line;

a dummy line;

a first transistor having a first source/drain coupled to a voltage supply and a gate coupled to receive information to be transmitted on said transmission line;

a second transistor having a first source/drain coupled to a second source/drain of said first transistor, a second source/drain coupled to said transmission line, and a gate coupled to a bias voltage;

a third transistor having a first source/drain coupled to said voltage supply and a gate coupled to receive a clock signal;

a fourth transistor having a first source/drain coupled to a second source/drain of said third transistor, a second source/drain coupled to said dummy line, and a gate coupled to said bias voltage, said fourth transistor differs in size from said second transistor; and receiver circuitry for detecting a voltage difference between said transmission line and said dummy line to determine a logic state of transmitted information on said transmission line.

8. The circuitry of claim 7 wherein said second transistor is larger than said fourth transistor.

9. The circuitry of claim 8 wherein said second transistor is approximately twice as large as said fourth transistor.

10. The circuitry of claim 7 wherein said first, second, third, and fourth transistors are of a first type and further comprising:

a fifth transistor of a second type having a first source/drain coupled to said information line, a second source/drain coupled to ground and a gate coupled to receive said clock signal; and a sixth transistor of said second type having a first source/drain coupled to said dummy line, a second source/drain coupled to ground and a gate coupled to receive said clock signal.

11. The circuitry of claim 10 wherein said first type comprises p-type and said second type comprises n-type.

12. The circuitry of claim 7 wherein said receiver circuitry comprises:

latching circuitry including:

a first transistor of a first type having a first source/drain coupled to a supply voltage rail;

a second transistor of a second type having a first source/drain coupled to a second source/drain of said first transistor and a second source/drain coupled to ground;

a third transistor of said first type having a first source/drain coupled to said supply voltage rail; and a fourth transistor of said second type having a first source/drain coupled to a second source/drain of said third transistor and a second source/drain coupled to ground;

a first control transistor having a gate coupled to said information line, a first source/drain coupled to respective gates of said first and second transistors of said latching circuitry and said second source/drain of said third transistor of said latching circuitry, and a second source/drain coupled to ground; and a second control transistor having a gate coupled to said dummy line, a first source/drain coupled to respective gates of said third and fourth transistors of said latching circuitry and said second source/drain of said first transistor of said latching circuitry, and a second source/drain coupled to ground.

13. The circuitry of claim 12 and further comprising:

a transistor of said first type having a current path coupling said first source/drain of said first control transistor with said gates of said first and second transistors of said latching circuitry and said second source/drain of said third transistor of said latching circuitry, and a gate coupled to receive a delayed clock signal generated from said clock signal; and a transistor of said first type having a current path coupling said first source/drain of said second control transistor with said gates of said third and fourth transistors of said latching circuitry and said second source/drain of first transistor of said latching circuitry, and a gate coupled to receive said delayed clock signal.

14. The circuitry of claim 13 and further comprising a transistor of said first type having a first source/drain coupled to said gates of said third and fourth transistors of said latching circuitry and said second source/drain of said first transistor of said latching circuitry, a second source/drain coupled to ground, and a gate coupled to receive a complement signal of said delayed clock signal.

15. A system including a memory coupled to associated processing circuitry by information transmission circuitry, said transmission circuitry comprising:

an information line;

a dummy line;

driver circuitry for transmitting information on said information line, said transmission circuitry pulling said information line to a low voltage during transmission of information of a first logic state and charging said information line to a higher voltage during transmission of information of a second logic state;

charging circuitry for charging said dummy line to a reference voltage, at a rate lower than a rate a which said driver circuitry charges said information line during transmission of information of said second logic state; and receiving circuitry for detecting a voltage difference between said information line and said dummy line, said receiving detecting information of said first logic state when said voltage on said information line is less than said reference voltage on said dummy line and detecting information of said second logic state when said voltage on said information line is greater than said voltage on said dummy line.

16. The system of claim 15 wherein said information line comprises a line of a information bus.

17. The system of claim 15 wherein said information line comprises a line of an address bus.

18. The system of claim 15 wherein said memory comprises a frame buffer and said processing circuitry comprises a display controller.

19. The system of claim 15 wherein said memory and said processing circuitry are disposed on a single chip.

20. A method of transmitting information between first and second endpoint circuits comprising the steps of:

pulling a transmission line coupling the first and second endpoint circuits to a low voltage during transmission .of information of a first logic state and charging the transmission line to a higher voltage during transmission of information of a second logic state;

charging a dummy line at a rate different than a rate a which the transmission line is charged during the transmission of information of the second logic state; and detecting a voltage difference at the second endpoint circuit between the transmission line and the dummy line, information of the first logic state detected when the voltage on the transmission line is less than the reference voltage on the dummy line and information of the second logic state detected when the voltage on the transmission line is greater than the reference voltage on the dummy line.

21. The method of claim 20 wherein said step of charging the dummy line comprises the step of charging the dummy line at a rate of approximately half the rate of charging the transmission line.

\* \* \* \* \*